UNITED STATES PATENT OFFICE.

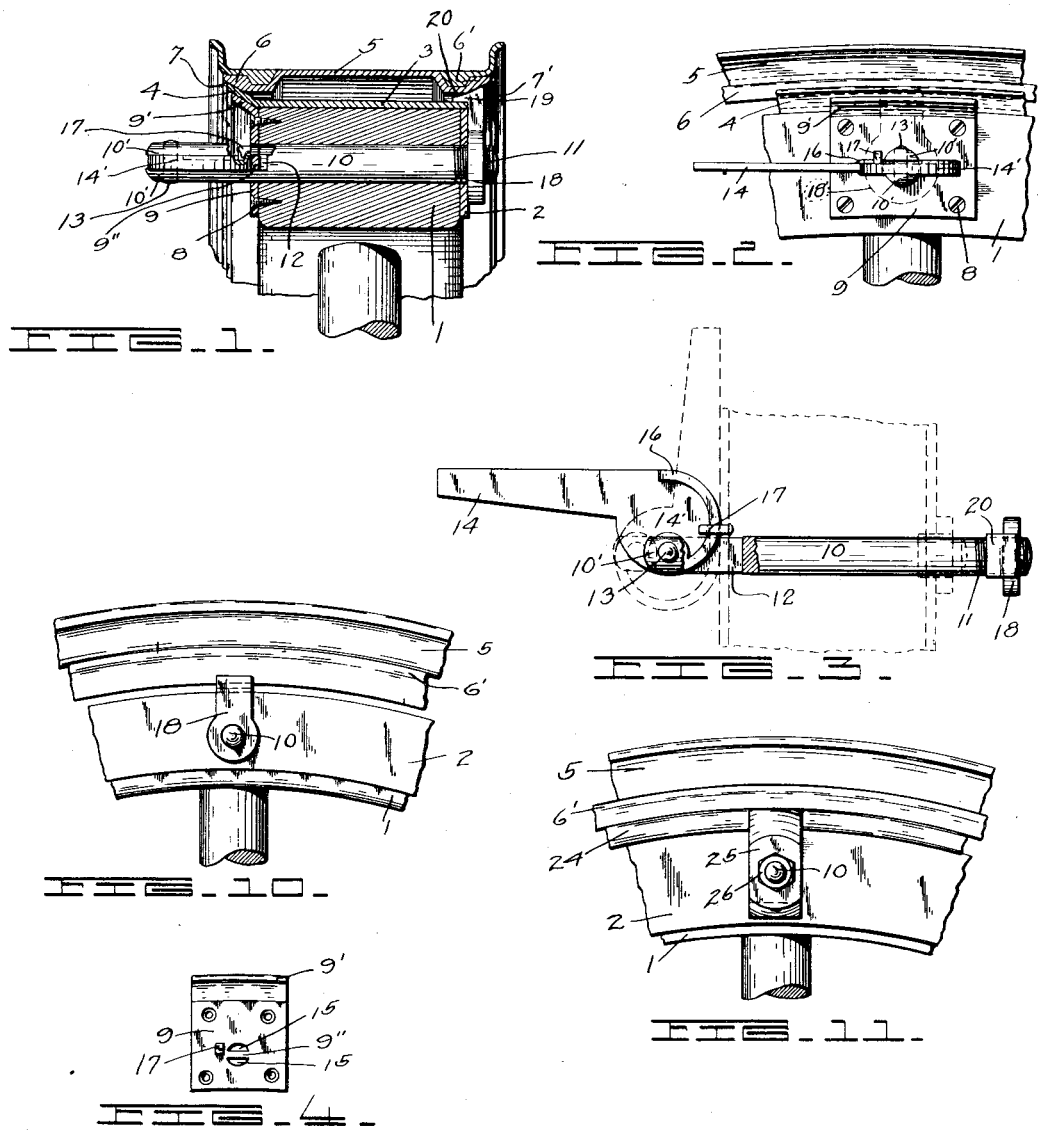

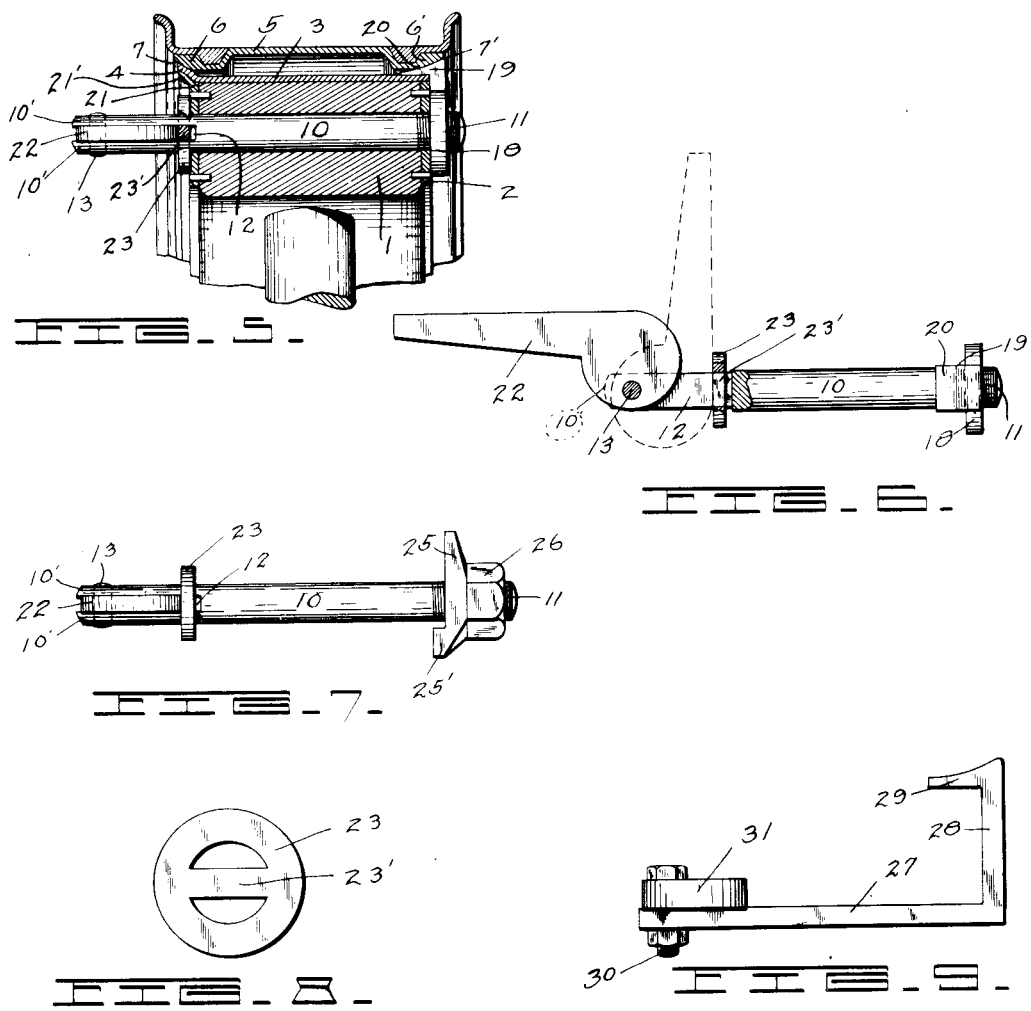

FRANK D. HILLER, JR., AND MAURICE R. KOHN, OF ST. LOUIS, MISSOURI, ASSIGNORS OF FIVE AND SEVENTY-ONE ONE-HUNDREDTHS PER CENT. TO FRANK D. HILLER, SR., OF WEBSTER GROVES, MISSOURI.

LOCKING MEANS FOR DEMOUNTABLE RIMS FOR AUTOMOBILE-WHEELS AND THE LIKE.

1,137,319. Specification of Letters Patent. Patented Apr. 27, 1915.

Application filed October 19, 1914. Serial No. 867,377.

*To all whom it may concern:*

Be it known that we, FRANK D. HILLER, Jr., and MAURICE R. KOHN, citizens of the United States, residing at the city of St. Louis, State of Missouri, have jointly invented a certain new and useful Improvement in Locking Means for Demountable Rims for Automobile-Wheels and the like, of which the following is a specification, reference being had to the accompanying drawings, forming a part thereof.

This invention relates generally to automobile wheels and the like and, more particularly, to that class of automobile wheels having demountable tire-holding rims, the principal object of our present invention being to provide simple and comparatively inexpensive means capable of easy and convenient manipulation and actuation for quickly and efficiently releasably or detachably locking the demountable rim upon the wheel.

With the above and other objects in view, our invention resides in certain novel features of form, construction, arrangement, and combination of parts, all as will hereinafter be described and afterward pointed out in the claims.

In the accompanying drawings, which show our invention in several forms, Figure 1 is a fragmentary transverse sectional view of an automobile wheel equipped with our invention in preferred form, the pneumatic or other tire of the wheel being omitted; Fig. 2 is an elevational view of the same as viewed from the inner side thereof; Fig. 3 is a plan view, partly in section, of the rim-locking means shown in Figs. 1 and 2, parts of the wheel being omitted; Fig. 4 is a side elevational view of one of the members forming part of the preferred form of our invention; Fig. 5 is a fragmentary transverse sectional view of an automobile wheel equipped with our invention in slightly modified form, the pneumatic or other tire of the wheel being also omitted; Fig. 6 is a plan view, partly in section, of the rim-locking means shown in Fig. 5, parts of the wheel being omitted; Fig. 7 is a side elevational view of rim-locking means embodying our invention in another slightly modified form; Fig. 8 is a face view of the washer or wear-plate preferably employed with the rim-locking means shown in Figs. 5, 6, and 7; Fig. 9 is a side elevational view of rim-locking means embodying our invention in still another slightly modified form; Fig. 10 is a fragmentary elevational view of an automobile wheel, as viewed from the outer side thereof, equipped with the forms of our invention shown in Figs. 1 and 5; and Fig. 11 is a similar view of an automobile wheel equipped with the form of our invention shown in Fig. 7.

Referring to the said drawings, in which like reference characters refer to like parts throughout the several views, 1 indicates the usual wooden felly of an automobile wheel or the like, 2 a flat preferably continuous ring-shaped metallic member flatwise preferably fixed to and upon the outer side face of felly 1, as seen more particularly in Fig. 10, 3 a relatively broad or wide hoop-shaped metallic band or rim-engaging member preferably fixed to and upon the tread face of felly 1, band or member 3 being provided preferably integrally at one side edge with an obliquely outwardly and upwardly disposed (reference being had to Fig. 1) annular flange 4, and 5 a demountable rim for the wheel, all said parts being of any approved or standard construction. This rim 5, which is adapted, as will be well understood, to engage with and hold a pneumatic or other tire, includes annular portions or members 6—6' having oppositely disposed oblique under faces, as at 7—7', respectively. In operation or use, rim 5 is adapted to encircle and fit on rim-engaging or wheel-member 3 with its said portion 6 engaging at its under or oblique face 6' with said annular oblique flange 4 of wheel-member 3, as shown in Fig. 1, rim 5 being demountably locked on the wheel by our new rim-locking means now to be described.

Suitably flatwise fixed, as by means of screws or the like 8, to and upon preferably the inner side face of felly 1, as seen particularly in Fig. 2, is a relatively small plate 9. Preferably plate 9 is provided at and along its upper edge with a lengthwise curved obliquely outwardly disposed flange 9' adapted to underlie and brace or reinforce oblique flange 4 of rim-engaging member 3, as shown particularly in Fig. 1.

Transversely fitting loosely through felly 1 and said ring-shaped member 2 and plate 9 and projecting at its opposite ends therebeyond, as seen in Fig. 1, is a bolt or the like 10 preferably threaded at one, or its outer, end, as at 11, and preferably centrally longitudinally slotted or bifurcated, as, at 12, at its other, or inner, end to provide legs 10'—10'.

Arranged between, and pivotally fastened, as at 13, to, legs 10'—10' of bolt 10, is a lever 14 having a cam-head or extension 14' swingably movable in slot or groove 12. It will be seen from Fig. 4 that plate 9 is formed or provided with a pair of segmental-shaped openings 15—15 to permit the passage therethrough of legs 10'—10' of bolt 10, the portion 9'' of plate 9 intermediate of said openings providing what might be called a wear-surface for cam-lever 14 as the same is swung to and from rim-locking position.

On preferably the upper face of its cam-head or portion 14', lever 14 is provided with a cam-lug, as at 16, with which is adapted to workably engage, for purposes hereinafter appearing, a hook-shaped member 17 projecting laterally from plate 9.

Threaded on the outer end 11 of bolt 10, is a member or block 18 provided at one, or its upper, end with a laterally projecting extension or wedge-portion 19 having an oblique upper face, as at 20, to coöperate with oblique face 7' of portion 6' of rim 5.

Rim 5 being mounted in position upon the wheel with its said portion 6 engaging, as described, with flange 4 of wheel-member 3, on cam-lever 14 being swung from rim-unlocking to rim-locking position, or from the position thereof shown in full lines in Fig. 3 to the position thereof shown in dotted lines in Fig. 3, bolt 10 will, through the cam engagement of cam-head 14' with plate 9, be lengthwise pulled or moved relatively to felly 1 and portion 19 of block 18 forced or wedged between, and firmly, positively, and rigidly held, between rim-engaging member 3 and said oblique portion 6' of rim 5, rim 5 being thereby demountably locked operatively upon the wheel. It is, of course, to be understood that the wheel as a whole may be provided with any desired number of our new rim-locking means, the same being arranged in the form of an annular suitably spaced apart series around the wheel, levers 14, when in rim-locking position, as seen in Fig. 2 and also in dotted lines in Fig. 3, lengthwise projecting with a face thereof flatwise upon felly 1 and thus severally occupying but small space and in no way impeding the rotary movement of the wheel or interfering with parts of the car upon which the wheel may be mounted. To demount rim 5, it is only necessary to reversely swing levers 14, when, through the engagement particularly of said hook-shaped members 17 with the cam-lugs 16 of the several levers, bolts 10 will be reversely lengthwise moved relatively to felly 1 and blocks 18 with their said wedge-portions 19 forced out of locking engagement with the rim.

We have, from experience found our new rim-locking means to be most efficient in positively and rigidly locking and maintaining the demountable rim upon the wheel. Furthermore, our new rim-locking means, while, as seen from the foregoing, comparatively simple in form and construction, may be readily and conveniently manipulated from either rim-locking to rim-unlocking position or from rim-unlocking to rim-locking position, the demountable rim being thus locked or unlocked upon the wheel quickly and without the use of wrenches or other like tools.

The form of our invention illustrated in Figs. 5 and 6 is greatly similar to the preferred form thereof hereinbefore described and specifically shown in Figs. 1, 2, and 3, the principal difference therebetween being that in this form of our invention, to lessen manufacturing costs and hence provide a somewhat cheaper construction, we preferably omit, as will be seen, the automatic wedge or block releasing means provided by cam-lugs 16 and their coöperating members 17 brought into operation on the cam-levers being actuated or swung from rim-locking to rim-unlocking position. Accordingly, reference being had particularly to Fig. 5, we preferably flatwise fix to and upon the inner side face of felly 1 a flat preferably continuous ring-shaped metallic member 21, corresponding to ring-shaped member 2 on the outer side face of felly 1, but obliquely provided at its outer peripheral edge with an annular flange 21' underlying and bracing flange 4 of rim-engaging member 3. Also interposed on bolt 10 between ring-shaped member 21 and cam-lever 22 of this form of our invention is a preferably circular washer 23 adapted to provide at its central portion 23' a wear-surface or plate for cam lever 22. On cam-lever 22 being swung from rim-locking to rim-unlocking position, automatic wedge releasing means being omitted, the application upon the inner end of bolt 10 of a hammer or other suitable tool may be necessary to release or force blocks 18 and their wedge-portions 19 from operative engagement with the rim 5.

The form of our invention illustrated in Figs. 7 and 11 is approximately similar to the form of our invention shown specifically in Figs. 5 and 6, except that, instead of having a plurality of blocks having wedge shaped portions to engage the rim 5, as also in the preferred form of our invention shown in Figs. 1, 2, and 3, we preferably employ a continuous annular band 24 wedge-shaped in cross-section fitting between portion 6' of rim 5 and wheel-member 3, the 13 securing blocks 25 therefor upon bolts 10 being adapted, when in rim-locking position, to flatwise engage at one end with the outer face of band 24 to maintain the same operatively in position and at their other end being provided with shouldered portions 25' adapted to bear upon outer ring 2 of the wheel. In this form, also, a nut or the like 26 may, if desired, be threaded upon end 11 of bolt 10 to lock the block 25 in position thereupon.

To still further provide a cheaper form of our invention, we may employ, as shown particularly in Fig. 9, a preferably integral felly-engaging member of approximately L-shape, the long leg 27 thereof transversely underlying the felly of the wheel and the short leg 28 thereof being provided at its outer end with a wedge-shaped portion 29 corresponding to said wedge-shaped portion 19 of block 18 and being similarly adapted to fit between rim 5 and wheel-member 3 to demountably lock the rim 5 in operative position upon the wheel. Pivotally fastened, as by means of a bolt 30, to and upon said long leg portion 27 at or adjacent its outer end, is a cam-lever 31 corresponding in function to said cam-levers 14 and 22, respectively, wedge-portion 29 and cam-lever 31, when in locking engagement with the wheel, serving also to securely hold and retain the device operatively upon the wheel.

We are aware that changes in the form, construction, arrangement, and combination of the several parts of our new rim-locking means may be made and substituted for those herein shown and described without departing from the nature and spirit of our invention.

Having thus described our invention, what we claim and desire to secure by Letters Patent is:

1. A locking device for demountable wheel-rims comprising a member adapted to transversely engage the felly of the wheel, a lever, an extension on said lever, said extension being approximately flat on its opposite side faces and annularly rounded at its edge, and a pivot-pin engaging said member and said extension for pivotally fastening said lever and its said extension to said member, said extension being flatwise and eccentrically disposed relatively to said member, whereby the lever, on being swung to locking position, is adapted to camwise at the rounded edge of its said extension engage the felly of the wheel.

2. A locking device for demountable wheel-rims comprising a member adapted to transversely engage the felly of the wheel, a lever, an extension on said lever, said extension being approximately flat on its opposite side faces and annularly rounded at its edge, a pivot-pin engaging said member and said extension for pivotally fastening said lever and its said extension to said member, said extension being flatwise and eccentrically disposed relatively to said member, whereby the lever, on being swung to locking position, is adapted to camwise at the rounded edge of its said extension engage the felly of the wheel at one side thereof, and a block on said member adapted to operatively engage the felly of the wheel on an opposite side thereof when said lever is in locking position.

3. A locking device for demountable wheel-rims comprising a bolt adapted to be passed transversely through the felly of the wheel, said bolt being longitudinally slotted at one end, a cam-lever pivotally fastened to said bolt and swingable in the slot thereof to camwise engage the wheel when in locking position, and a block on said bolt adapted also to engage the wheel when said lever is in locking position.

4. The combination with a wheel and its felly, of a rim-engaging member on said wheel, said member having an obliquely disposed flange, a tire-rim encircling said rim-engaging member and provided with a pair of oppositely disposed oblique faces, said flange being adapted to engage with one of said faces, a bolt extending transversely loosely through said felly, said bolt being longitudinally slotted at one end, a cam-lever pivotally fastened to said bolt and swingable in the slot thereof to engage the wheel, and a block also carried by said bolt, said block having a wedge-shaped portion adapted to operatively engage with the other oblique face of said tire-rim, substantially as and for the purposes described.

5. The combination with a wheel and its felly, of a rim-engaging member on said wheel, said member having an obliquely disposed flange, a tire-rim encircling said rim-engaging member and provided with a pair of oppositely disposed oblique faces, said flange being adapted to engage with one of said faces, a bolt extending transversely loosely through said felly, said bolt being longitudinally slotted at one end, a cam-lever pivotally fastened on said bolt and swingable in the slot thereof to engage the wheel, a block also carried by said bolt, said block having a wedge-shaped portion adapted to operatively engage with the other oblique face of said tire-rim, and a wear-plate for said cam-lever, substantially as and for the purposes described.

6. In a locking device for demountable wheel-rims, the combination with a wheel and its felly, of a bolt slidably extending transversely through the felly of the wheel, a cam-lever pivotally fastened to said bolt to camwise engage the felly of the wheel on being swung to locking position, a block on said bolt adapted also to engage the felly of the wheel when said lever is in locking position, and coöperating members on the wheel and lever adapted to slidably actuate said bolt relatively to the wheel to carry said block out of operative engagement with the felly of the wheel on said lever being swung to unlocking position.

7. In a locking device for demountable wheel-rims, the combination with a wheel and its felly, of a bolt slidably extending transversely through the felly of the wheel, said bolt being longitudinally slotted at one end, a cam-lever pivotally fastened to said bolt and swingable in the slot thereof to camwise engage the felly of the wheel when in locking position, a block on said bolt adapted also to engage the felly of the wheel when said lever is in locking position, and coöperating members on the wheel and lever adapted to slidably actuate said bolt relatively to the wheel to carry said block out of operative engagement with the felly of the wheel on said lever being swung to unlocking position.

8. The combination with a wheel and its felly, of a rim-engaging member on said wheel, said member having an obliquely disposed flange, a tire-rim encircling said rim-engaging member and provided with a pair of oppositely disposed oblique faces, said flange being adapted to engage with one of said faces, means for demountably locking said tire-rim upon said rim-engaging member, said means including a bolt extending transversely loosely through said felly, a lever, a rounded extension on said lever, said lever being pivotally fastened eccentrically at its said extension to said bolt to camwise engage the felly on being swung to locking position, and a block also carried by said bolt, said block having a wedge-shaped portion adapted to operatively engage with the other oblique face of said tire-rim, when said lever is in locking position, and means for forcing said block out of operative position on said lever being swung to unlocking position, said means last-named including a cam-lug on said lever extension, and a member on the wheel adapted to engage with said lug.

In testimony whereof, we have signed our names to this specification, in the presence of two subscribing witnesses.

FRANK D. HILLER, JR.
MAURICE R. KOHN.

Witnesses:
  RUTH PETERSON,
  S. J. BERNHEIMER.